United States Patent
Xin et al.

(10) Patent No.: US 8,430,348 B2
(45) Date of Patent: Apr. 30, 2013

(54) GARBAGE DISPOSER

(75) Inventors: Shixi Xin, Zhejiang (CN); Chunping Tan, Zhejiang (CN)

(73) Assignee: Xiaohua Xu, Hengdian Electronic Industrial Zone, Dongyang, Zhejiang (CN)

(*) Notice: Subject to any disclaimer, the term of this patent is extended or adjusted under 35 U.S.C. 154(b) by 157 days.

(21) Appl. No.: 13/059,417

(22) PCT Filed: Mar. 13, 2009

(86) PCT No.: PCT/CN2009/070781
§ 371 (c)(1),
(2), (4) Date: Feb. 17, 2011

(87) PCT Pub. No.: WO2010/020119
PCT Pub. Date: Feb. 25, 2010

(65) Prior Publication Data
US 2011/0147506 A1    Jun. 23, 2011

(30) Foreign Application Priority Data
Aug. 18, 2008 (CN) .......................... 2008 1 0120212

(51) Int. Cl.
*B02C 19/00* (2006.01)

(52) U.S. Cl.
USPC .............. 241/57; 241/60; 241/65; 241/101.2

(58) Field of Classification Search .................... 241/57, 241/60, 101.2, 65
See application file for complete search history.

(56) References Cited

FOREIGN PATENT DOCUMENTS
WO  PCT/CN2009/070781    6/2009

*Primary Examiner* — Mark Rosenbaum
(74) *Attorney, Agent, or Firm* — Global IP Services; Tianhua Gu

(57) ABSTRACT

A garbage disposer includes a casing, a garbage cup (103), a stirrer, an electrical heater (110), a deodorizing box (111) and a blower (113). An impeller (3) is arranged in the chamber surrounded by the mounting board (1) of the blower and the blower casing (2). An electromotor (4) is arranged at the other side of the mounting board. The output shaft of the electromotor drives the impeller (3) through the mounting board (1). The inlet (96) of the blower is provided on the blower casing in the axis direction of the impeller. The outlet (97) of the blower is provided on the circumference of the blower casing. The mounting board (1) includes a board body (81) and a mounding portion (82) formed integrally. The board body (81) and the mounding portion (82) are perpendicular to each other. Several recesses (85) are formed by punch on the outside of the right angle (83) formed by the board body (81) and the mounding portion (82). Then the stability of the blower can be improved and the vibration and the noises can be reduced.

10 Claims, 9 Drawing Sheets

GARBAGE DISPOSER

CROSS REFERENCE TO RELATED PATENT APPLICATION

The present application is the U.S. national stage of PCT/CN2009/070781 filed on Mar. 13, 2009, which claims the priority of the Chinese patent application No. 200810120212.8 filed on Aug. 18, 2008, which application is incorporated herein by reference.

FIELD OF THE INVENTION

The invention relates to a garbage disposer, in particular to a domestic food waste disposer.

BACKGROUND OF THE INVENTION

A household organic waste biological disposer (publication No. CN2652926Y) comprises an outer barrel and an inner liner. A drive device is mounted in the gap between the inner liner and the outer barrel. The drive device is mounted in a drive box and is driven in the drive box. An agitation structure conducts positive and negative tuning periodically. In addition, a deodorization device and a ventilation channel are still mounted in the gap between the inner liner and the outer barrel and a cavity of the inner liner is correspondingly communicated with the ventilation channel and the deodorization device through a ventilation outlet and a deodorant export mouth. The deodorization device comprises two blowers, wherein the inlet of one blower is directly communicated with the deodorant export mouth on the inner liner, the outlet of the blower is connected with a deodorization pipe and then intersects with the outlet of the other blower communicated with outside, the intersection is provided with a gas mixing cavity, and an exhaust pipe is led out from the gas mixing cavity.

Because the above waste disposer is used in home environment, the blowers must be mounted in the waste disposer reliably, otherwise the blowers will generate greater vibration and noise causing disturbance to application environment.

SUMMARY OF THE INVENTION

The object of the invention is to provide a garbage disposer capable of ensuring reliable mounting of a blower and less vibration and noise of the blower in operation and solve the problems of poor mounting reliability of blower, higher vibration and noise in operation, and the like, of the existing garbage disposers.

The technical object of the invention is achieved by the following technical solution: the garbage disposer comprises a casing formed by a bottom, a surrounding wall and a top cover at the top; two brackets are disposed on the bottom at intervals, and a garbage cup having an opening at the upper end is fixedly mounted between the two brackets; the top cover is articulated with one side of the opening at the upper end of the garbage cup; a stirrer is rotatably supported in the garbage cup, the rotating shaft of the stirrer extends to the outside of one side of the garbage cup, an agitation driving motor is arranged besides the outside of the side of the garbage cup, and the agitation driving motor and rotating shaft of the stirrer are in transmission connection via a chain; the garbage cup is provided with an air inlet communicated with the outside of the casing and a gas outlet, and an electrical heater is arranged on the outer wall of the garbage cup; a deodorizing box is disposed between the garbage cup and the wall of the casing, the deodorizing box is filled with chemical deodorizing oxidation material and has a gas inlet and gas outlet, the gas inlet of the deodorizing box is communicated with the gas outlet of the garbage cup, the gas outlet of the deodorizing box is communicated with the inlet of a blower mounted on the bottom of the casing, and the outlet of the blower communicated with the outside of the casing. Said blower comprises a mounting board and a blower casing disposed on one side of the mounting board, an impeller is arranged in the chamber surrounded by the mounting board and the blower casing, an electromotor is arranged at the other side of the mounting board, the output shaft of the electromotor penetrates through the mounting board and is connected with the impeller in a transmission mode, the inlet of the blower is positioned on the blower casing and is coaxial with the impeller, and the outlet of the blower is positioned on the circumference of the blower casing; the mounting board includes a board body and a mounting portion which are formed integrally and are transitional by a break angle, the break angle forms an external corner part and an internal corner part, the external corner part of the break angel is punched into a plurality of recesses, and a plurality of protrusions are correspondingly formed at the internal corner part of the break angle. Wherein, the recesses formed at the external corner part and the protrusions formed at the internal corner part of the break angle between the board body and the mounting portion function as rib stiffeners to suffice for the strength of the break angle between the board body and the mounting portion, so that the blower can be mounted on the garbage disposer via the mounting board and the mounting portion, the vibration of the board body and the mounting portion is prevented to ensure the mounting reliability of the blower, the vibration of the blower is reduced in operation, and the noise is decreased when the garbage disposer works; In addition, the mounting board is machined only by punching, thus the machining is simple and the cost is not increased; and the opening at the upper end of the garbage cup can be opened or closed by opening and closing the top cover. When the garbage disposer is used, a certain amount of substrate containing bacterial for decomposing food waste is filled in the garbage cup in advance, then the top cover is opened, and food waste is thrown in the garbage cup; the top cover is closed, the agitation driving motor drives the stirrer in the garbage cup to mix the food waste with the substrate, and the electrical heater on the outer wall of the garbage cup heats the garbage cup according to the condition of temperature in the garbage cup to ensure the temperature in the garbage cup to be suitable for the bacterial; meanwhile, the blower works continuously to exhaust odorous gas into a deodorizing box, the gas is treated by chemical deodorization in the deodorizing box and then exhausted to outside of the casing by the blower, and air is continuously supplemented into the garbage cup through the air inlet of the garbage cup communicated with the outside of the casing. The operations of said agitation driving motor, the blower and the like are controlled by a program.

Preferably, said each recess is in a wedge shape having an acute apex angle, correspondingly, said each protrusion is in a wedge shape having an acute apex angle, and said recesses are distributed equidistantly at the external corner parts of the break angle. The wedge-shaped recesses and the wedge-shaped protrusions enable the break angle of the first part and the second part to have sufficient strength; and the equidistant distribution of the recesses at the external corner part of the break angle causes the strength of the break angle to be even overall.

Preferably, the break angle formed by the board body and the mounting portion is an included angle of 90 degree, which further improves the strength of the break angle between the board body and the mounting portion of the mounting board and ensures the mounting reliability of the blower.

Preferably, the transmission chain between the agitation driving motor and the rotating shaft of the stirrer is provided with a chain tension device. The chain tension device comprises a mounting body on which two pressing heads are slidably connected, said two pressing heads can slide oppositely or toward each other, the opposite inner sides of said two pressing heads respectively form an arc surface, and tension springs are connected between the two pressing heads. The chain tension device is mounted besides the chain through the mounting body, the inner sides of the two pressing heads respectively contact with the two outer sides of the chain, the pressing heads can always press the chain to prevent the chain from falling during transmission under the action of the tension springs, having automatic tension function for the chain and without manual adjustment, so that the use is more convenient.

Preferably, the pressing heads are respectively provided with a slide hole, and the mounting body penetrates through the slide holes of the pressing heads and is slidably connected with the pressing heads; both sides of said each pressing head respectively form a hook body, the number of the tension springs is two, and said two tension springs are respectively disposed at both sides of the mounting body, and both ends of each tension spring are respectively clasped with the hook bodies of the pressing heads; the mounting body is provided with a first insertion post and a second insertion post for insertion connection, wherein the first insertion post is positioned at one end of the mounting body and corresponds to the outer side of the pressing head at the end, the second insertion post is positioned at the other end of the mounting body and corresponds to the inner side of the pressing head at said the other end, and the mounting body corresponding to the outer side of the pressing head at said the other end is fitted with a large head limit portion for limiting the pressing head from removal; the arc surface of the inner side of said each pressing head is formed by a large middle arc surface having a larger diameter and two small arc surfaces having the diameter smaller than that of the larger arc surface; and the chain tension device is inserted in and fitted to the mounting hole formed on the brackets through the first insertion post and the second insertion post of the mounting body. Wherein, the pressing heads are slidably connected with the mounting body through the slide holes, the slide connection of the pressing heads and the mounting body is reliable and prevents deadlocking so as to reliably tense the chain; the tension springs are clasped with the pressing heads through the hook bodies, thus, one the one hand, the assembly is more convenient, and on the other hand, the connection between the tension springs and the pressing heads is more reliable; the insertion posts formed on the mounting body facilitate the mounting of the mounting body, and the mounting can be completed only by inserting the insertion posts into the mounting holes of the mounting portion, so the mounting is more convenient; wherein the first insertion post positioned at the outer side of one pressing head and the second insertion post positioned at the inner side of the other pressing head are cooperated with the large head limit part to cause the relative slide of the two pressing heads on the mounting body to have a maximum relative distance and a minimum relative distance so as to prevent over or insufficient tension of the chain; and the large arc surfaces of the inner sides of said pressing heads can be embedded into grooves on the outer side of the chain to prevent the pressing heads from separating from the chain.

Preferably, the mounting portion is provided with a plurality of mounting holes. A damper having a central hole is disposed in each mounting hole; the damper is formed by an upper sheet body and a lower sheet body at both ends and a cylinder body connecting the upper sheet body and the lower sheet body; and the upper sheet body and the lower sheet body are respectively positioned at both ends of each mounting hole of the mounting portion. With the damper structure having the sheet bodies at both ends, in mounting, screw nails or screw bolts can penetrate through the central holes of the dampers and can not directly contact with the mounting portion of the mounting board, the screw nails or screw bolts and the mounting board are insulated by the dampers, and the vibration probably generated by the blower in operation is absorbed by the dampers and thus can not be transmitted to the casing of the garbage disposer, so that the damping effect of the blower is greatly improved, and the noise generated by the vibration is decreased.

Preferably, both the upper sheet body and the lower sheet body of each damper are of round sheet structures. The external diameter of the upper sheet body as well as the external diameter of the lower sheet body is greater than the pore diameter of each mounting hole of the mounting portion; the thickness of the upper sheet body is greater than that of the lower sheet body, and the external diameter of the upper sheet body is smaller than that of the lower sheet body. Wherein, because the upper sheet body contacts with the head of the screw nail or screw bolt, the contacting area is smaller, so the pressure intensity on the upper sheet body is larger, and the thickness of the upper sheet body is designed to be greater than the thickness of the lower sheet body so as to prevent aging of the upper sheet body caused by over high pressure, thereby ensuring the favorable damping effect.

Preferably, the impeller is of a cup-shaped opening structure and comprises a bottom board at the bottom, a round ring at the top and a plurality of blades connected between the bottom board and the round ring. The center of said bottom board is provided with a transmission hole which is connected with the output shaft of the electromotor in a transmission mode; clearances are formed between adjacent blades of said blades for wind passing through; when the impeller rotates, air current enters the cup-shaped opening of the impeller from the inlet of the blower casing, passes through the clearances among the blades and is finally exhausted from the outlet of the blower casing; the bottom of the impeller gradually depresses towards the top from the circumference to the center, and the bottom board is also provided with a plurality of through holes surrounding the transmission hole. Wherein, because the blades of the impeller are distributed surrounding the center of the impeller, a cup-shaped opening is formed at the center of the impeller, the cup-shaped opening and the inlet facilitate the entry of air current, so that the passage of air current entering from the inlet, passing through the cup-shaped opening and the clearances among the blades and finally being exhausted from the outlet is more smooth, and the structure is more compact; the depression formed at the bottom of the impeller can reduce the friction between the bottom of the impeller and the mounting board and further reduce the power consumption; furthermore, the through holes formed on the bottom of the impeller can prevent generating negative pressure between the bottom of the impeller and the mounting board so as to facilitate the smooth rotation of the impeller.

Preferably, the opening edge of the blower casing is attached to the mounting board, the blower casing is connected with the mounting board by connecting screw bolts, a sealing ring is arranged between the opening edge of the blower casing and the mounting board, and the outer edge of the sealing ring is provided with outward protruding portions on which connecting holes are positioned for the connecting screw bolts passing through; one side of the sealing ring contacting with the opening edge of the blower casing is provided with a groove fitting to the opening edge of the blower casing. Wherein, one function of the mounting board is to enable the blower to be mounted on the mounting position of the garbage disposer, and the other function of the mounting board is to form a chamber with the blower casing for containing the impeller; the sealing ring is arranged between the mounting board and the opening edge of the blower casing, and the mounting board, the sealing ring and the blower casing are mounted and fixed together by screw bolts, so that the sealing performance between the mounting board and the blower casing is greatly improved, gas current is exhausted only from the outlet of the blower, the odorous gas in the garbage cup is favorably ensured to be exhausted into the deodorizing box to ensure the deodorizing effect of the garbage disposer, and the use is very convenient; and the groove formed on the sealing ring is fitted to the opening edge of the blower casing to further improve the sealing performance between the blower casing and the mounting board.

Preferably, the outlet of the blower casing forms an insertion connecting part, the external diameter of the insertion connecting part fits to the internal diameter of a wind pipe communicated with the outside of the casing, the root of the insertion connecting part forms a circle of stopper on which a plurality of blocking bodies pointing to the wind pipe are formed, and the inner sides of the blocking bodies closing to the end part of the wind pipe form blocking protrusions; correspondingly, the periphery of the end part of said wind pipe is provided with blocking bars fitting to the blocking protrusions of the blocking bodies, and the end surface of the wind pipe is abutted against the stopper positioned at the root of the insertion connecting part; the cross section of the insertion connecting part of the blower casing as well as the cross section of the wind pipe is in a rectangular shape, and said blocking bodies are arranged on the two opposite edges of the stopper of the insertion connecting part; a first insertion connecting surface of each block protrusion is perpendicular to the insertion connecting part, and correspondingly, a second insertion connecting surface of the wind pipe is perpendicular to the surface of the windpipe; and the end surface of each blocking protrusion closing to the wind pipe forms a first inclined surface, and the end surface of each blocking bar of the windpipe closing to the insertion connecting part of the blower casing correspondingly forms a second inclined surface. During connection, the windpipe is only inserted in and fitted to the insertion connecting part formed at the outlet of the blower casing, and when the wind pipe is completely fitted to the insertion connecting part of the blower casing, the blocking protrusions on the blocking bodies are blocked with and fitted to the blocking bars on the wind pipe, wherein the end surface of the wind pipe is abutted against the stopper at the root of the insertion connecting part to limit excessive fit between the wind pipe and the insertion connecting part of the blower casing, and the fit between the blocking protrusions on the blocking bodies and the blocking bars on the wind pipe prevents the wind pipe from separating from the blower casing so as to reliably connect the windpipe with the blower casing and limit the axial movement between the wind pipe and the blower casing; the insertion connecting part of the blower casing as well as the insertion connecting part of the windpipe has a rectangular section to facilitate the arrangement of the blocking bodies and the blocking bars; the first blocking surface of each blocking protrusion and the second blocking surface of the wind pipe employ vertical surfaces to ensure the reliability of the blocking connection between the wind pipe and the blower casing and prevent the separation of the wind pipe from the blower casing caused by external forces; when the wind pipe and the blower casing are in an insertion connection, the second inclined surface of the upper end of the blocking bar of the windpipe can interact with the first inclined surface to push the blocking body away and generate an elastic deformation, and when the windpipe is completely fitted to the insertion connecting part of the blower casing, the blocking protrusions on the blocking bodies are blocked with and fitted to the blocking bars on the wind pipe so as to facilitate the assembly of the wind pipe and the insertion connecting part of the blower casing.

Therefore, the invention can ensure reliable mounting of the blower and reduces the vibration and noise during blower operation.

DETAILED DESCRIPTION OF THE INVENTION

The technical solution of the invention is further described by combing the following embodiments and figures.

Embodiment 1

Figure 1:
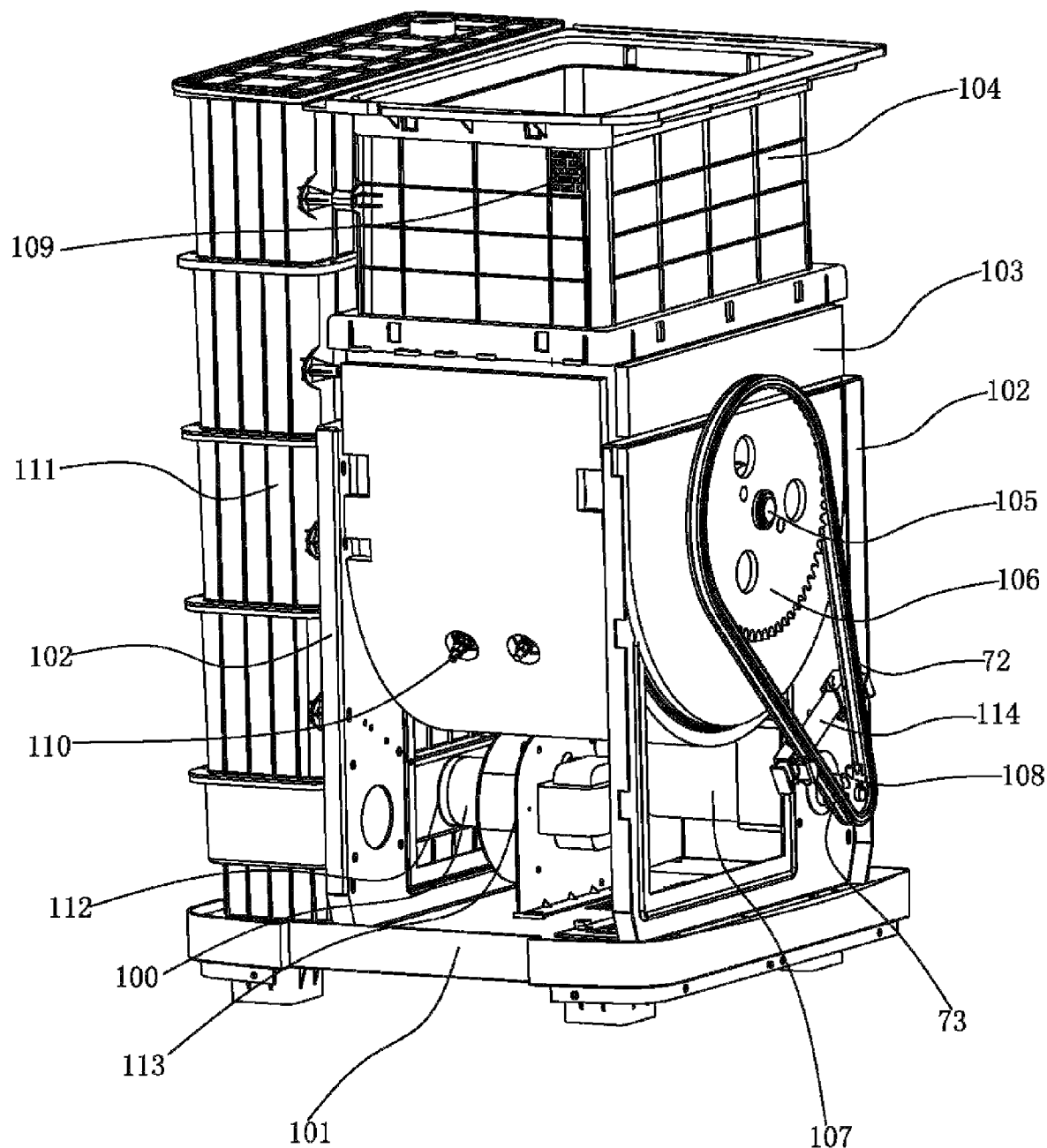
FIG. 1 is a structural schematic diagram of the invention without the top cover and the surrounding wall of the casing.

A casing includes a bottom, a surrounding wall and a top cover at the top, as shown in FIG. 1, two parallel brackets 102 are disposed on the bottom 101 at intervals, a garbage cup 103 having an opening at the upper end is fixedly mounted between said two brackets 102, the upper end of the garbage cup 103 is connected with a hollow heightened portion 104, the upper end edge of the garbage cup 103 is connected with the lower end edge of the heightened portion 104 in a sealing mode, the upper end of the garbage cup 103 impenetrates through the heightened portion 104, the top cover is articulated with the one side of the opening at the upper end of the heightened portion 104, and the opening at the upper end of the garbage cup can be opened and closed by opening and closing the top cover.

A stirrer (not shown) is rotatably supported in the garbage cup 103, the rotating shaft 105 of the stirrer extends to outside of one side of the garbage cup 103, the extending end of the rotating shaft 105 is provided with a big sprocket 106, an agitation driving motor 107 is correspondingly mounted on the bracket 102 which is positioned besides the outside of the side of the garbage cup, the output shaft end of the agitation driving motor 107 is provided with a small sprocket 108, the big sprocket 106 and the small sprocket 108 are in a transmission connection via a chain 72, the outer side of the chain 72 is provided with a groove 73, and a chain tension device 114 is mounted on the chain 72; the heightened portion 104 is positioned at the upper end of the garbage cup 103, one side of the heightened portion 104 close to the upper end is provided with an air inlet 109 communicated with outside of the casing, the other side of the heightened portion 104 close to the lower end is provided with a gas outlet (not shown), and an electrical heater 110 is arranged on the outer wall of the garbage cup 103; a deodorizing box 111 is disposed between the garbage cup 103 and the wall of the casing, the deodorizing box 111 is filled with chemical deodorizing oxidation material and has a gas inlet (not shown) and a gas outlet 112, the gas inlet of the deodorizing box 111 is communicated with the gas outlet of the garbage cup 103, the gas outlet of the deodorizing box 111 is communicated with the inlet of a blower 113 positioned on the bottom 101, and the outlet of the blower 113 is communicated with outside of the casing.

Figure 2:
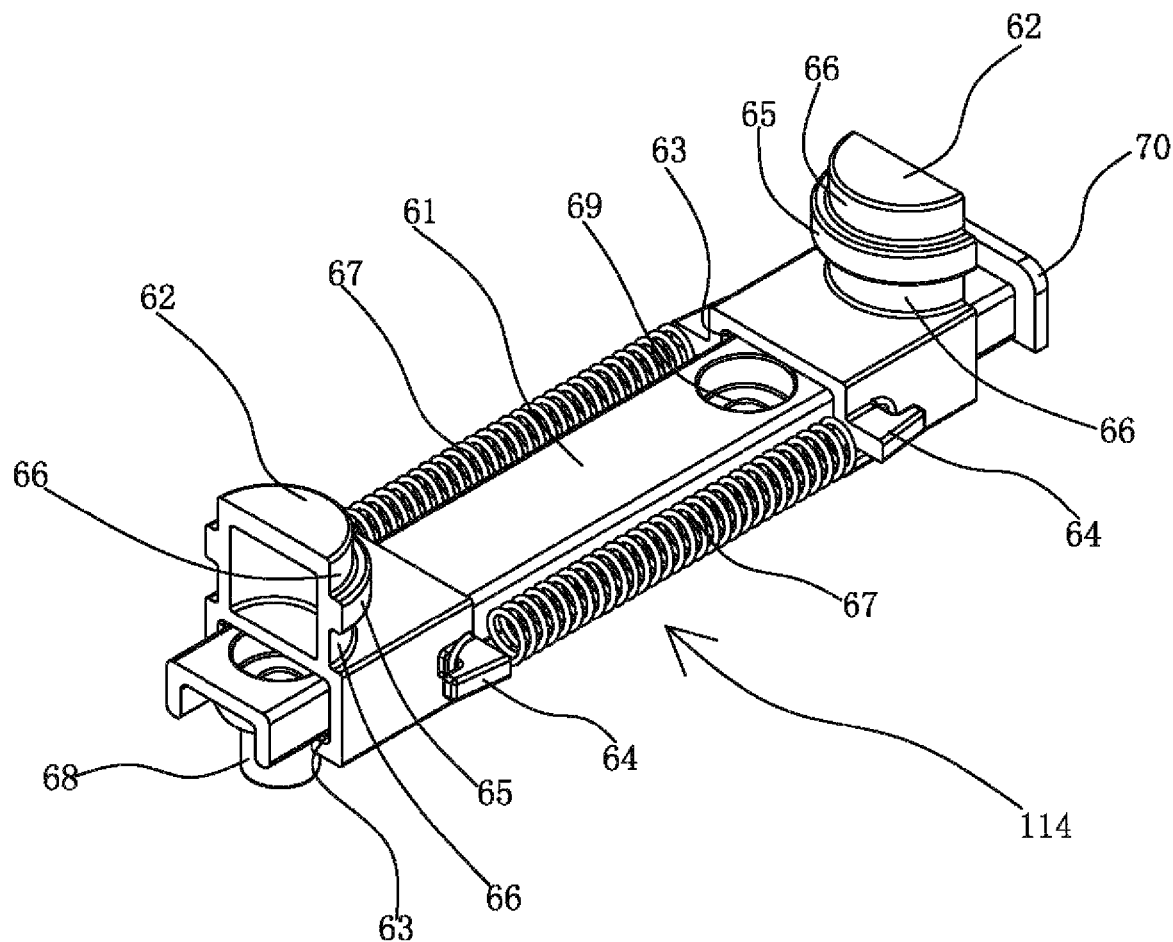
FIG. 2 is a structural schematic diagram of the chain tension device of the invention.
Figure 3:
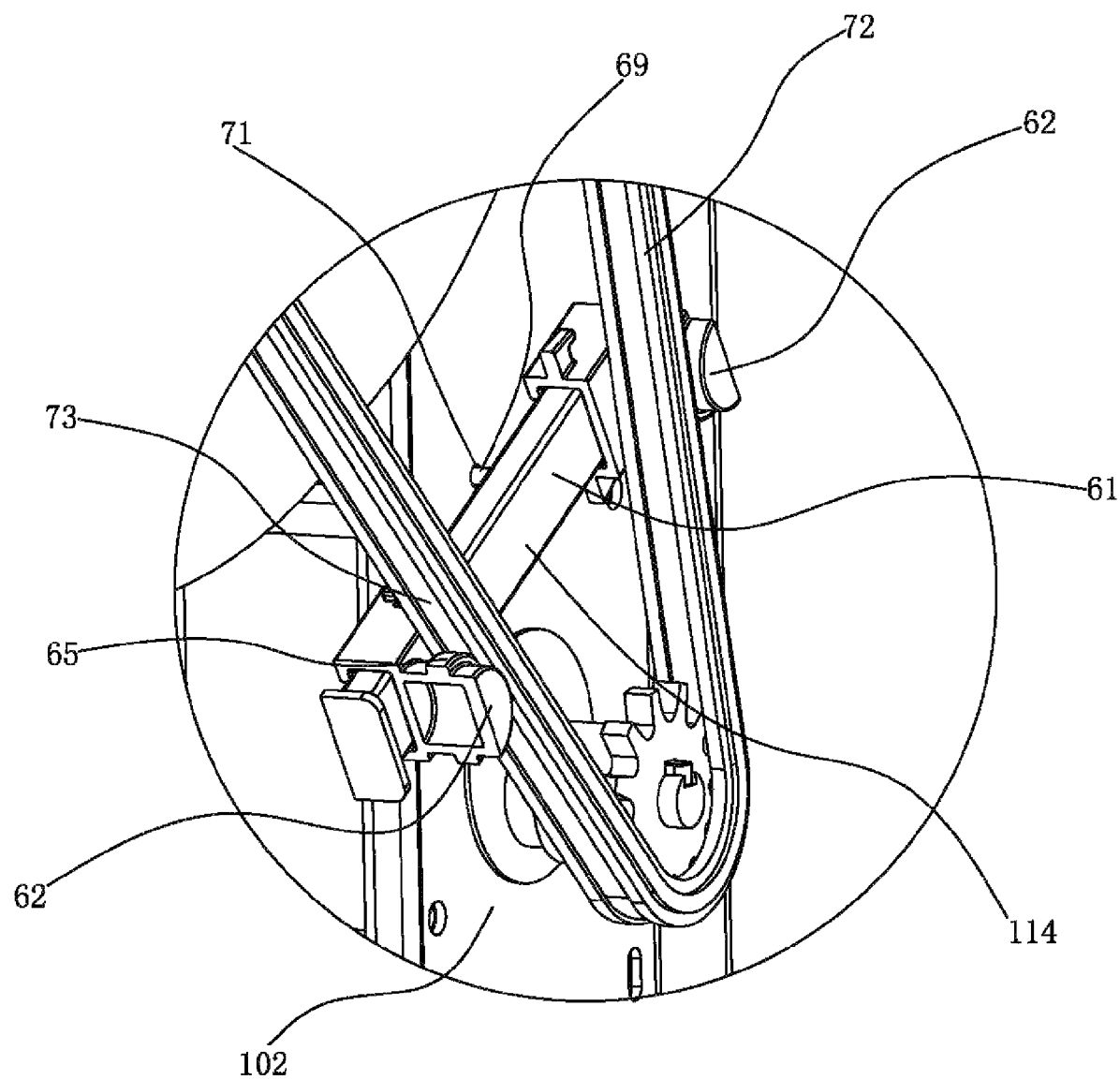
FIG. 3 is a magnified schematic diagram of the chain tension device mounted on the chain of the invention.

As shown in FIG. 2 and FIG. 3, a mounting body 61 of the chain tension device 114 is slidably connected with two pressing heads 62 which can slide oppositely or toward each other, each pressing head 62 is provided with a slide hole 63, the mounting body 61 penetrates through the slide holes 63 of the pressing heads 62 to be slidably connected with the pressing heads 62, both sides of each pressing head 62 are respectively provided with a hook body 64, the opposite surfaces of said each pressing heads 62 are respectively formed into an arc surface which is formed by a large middle arc surface 65 having a larger diameter and two small arc surfaces 66 having the diameter smaller than that of the large arc surface, two tension springs 67 are respectively arranged at both sides of the mounting body 61, and both ends of each tension spring 67 are clasped with the hook bodies 64 of the pressing heads 62; the mounting body 61 is provided with a first insertion post 68 and a second insertion post 69 for insertion mounting, wherein the first insertion post 68 is positioned at one end of the mounting body 61 and corresponds to the outer side of the pressing head 62 at said end, the second insertion post 69 is positioned at the other end of the mounting body 61 and corresponds to the inner side of the pressing head 62 at said the other end, and the mounting body 61 corresponding to the outer side of said the other end of the pressing head 62 is fitted with a large head limit part for limiting the removal of the pressing head.

As shown in FIG. 3, the chain tension device 114 is inserted into a mounting hole 71 of the bracket 102 via the first insertion post and the second insertion post 69 on the mounting body 61, the inner sides of the pressing heads 62 respectively contact with the two outer sides of the chain 72, the large arc surface 65 is embedded into the groove 73 of the chain 72, and under the action of the tension springs the arc surfaces of the inner sides of the pressing heads press the outer side of the chain 72 so as to tense the chain throughout.

Figure 4:
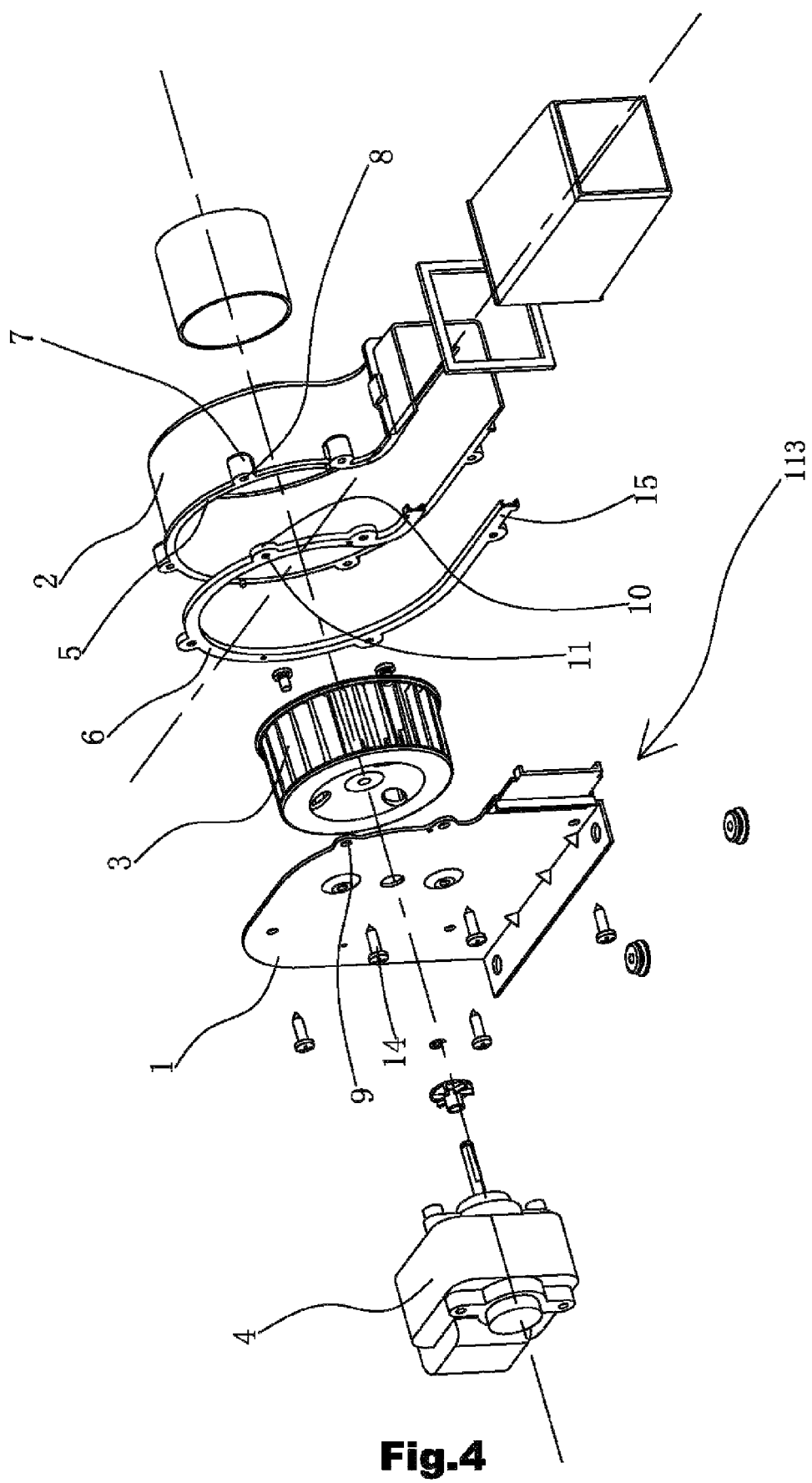
FIG. 4 is a schematic diagram of a disassembled structure of the blower of the invention.
Figure 6:
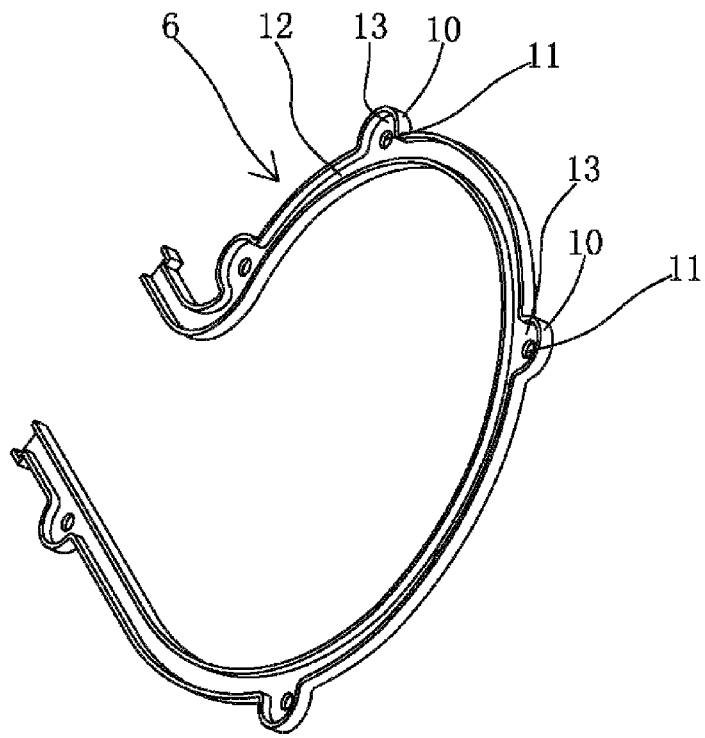
FIG. 6 is a structural schematic diagram of the sealing ring arranged between the mounting board and the blower casing of the invention.

As shown in FIG. 4, the blower 113 includes a mounting board 1 and a blower casing 2 disposed on one side of the mounting board 1, an impeller 3 is arranged in a chamber surrounded by the mounting board 1 and the blower casing 2, the other side of the mounting board is provided with an electromotor 4, the output shaft of the electromotor 4 penetrates through the mounting board 1 to be in transmission connection with the impeller 3, the opening edge 5 of the blower casing 2 is attached to the mounting board 1, a position of the blower casing 2 close to the opening edge 5 is provided with five cylinder protrusions 7 at intervals, one end of each cylinder protrusion 7 levels with the opening edge 5 of the blower casing 2, each cylinder protrusion 7 is provided with a threaded hole 8, and the mounting board 1 is provided with through holes 9 corresponding to the threaded holes 8 on the cylinder protrusions 7; a sealing ring 6 is arranged between the opening edge 5 of the blower casing 2 and the mounting board 1, the outer edge of the sealing ring is provided with outward protrusions 10, and each outward protrusion 10 is provided with a connecting hole 11 for a screw bolt penetrating through. As shown in FIG. 6, the side of the sealing ring 6 contacting with the opening edge 5 of the blower casing 2 is provided with a groove 12 fitting to the opening edge 5 of the blower casing 2, each outward protrusion 10 of the sealing ring 6 has an arc groove 13 with the internal diameter fitting to the external diameter of each cylinder protrusion 7 of the blower casing 2, the side of the sealing ring 6 contacting with the mounting board 1 is a smooth planar structure 15, and a connecting screw bolt 14 sequentially penetrates through the through hole 9 of the mounting board 1 and the connecting hole 11 of the sealing ring 6 and fits to the threaded hole 8 of the cylinder protrusion 7 to fixedly connect together the mounting board 1, the sealing ring 6 and the blower casing 2 in a sealing mode.

Figure 5:
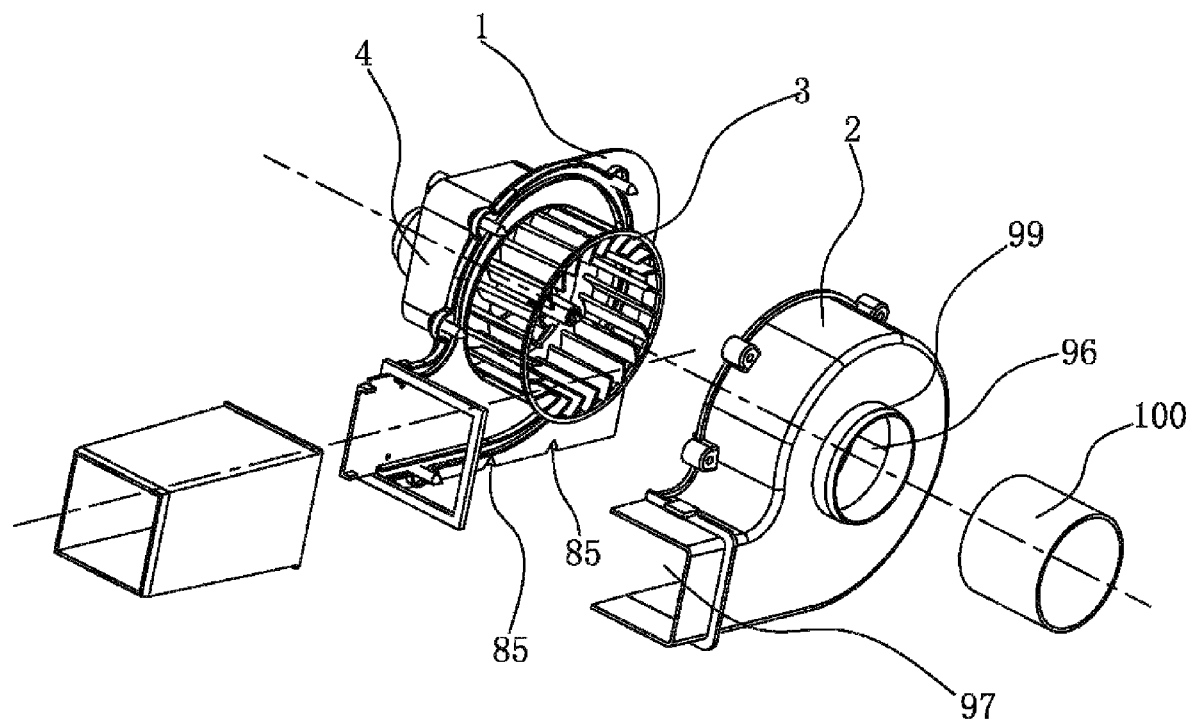
FIG. 5 is a schematic diagram of another disassembled structure of the blower of the invention.
Figure 7:
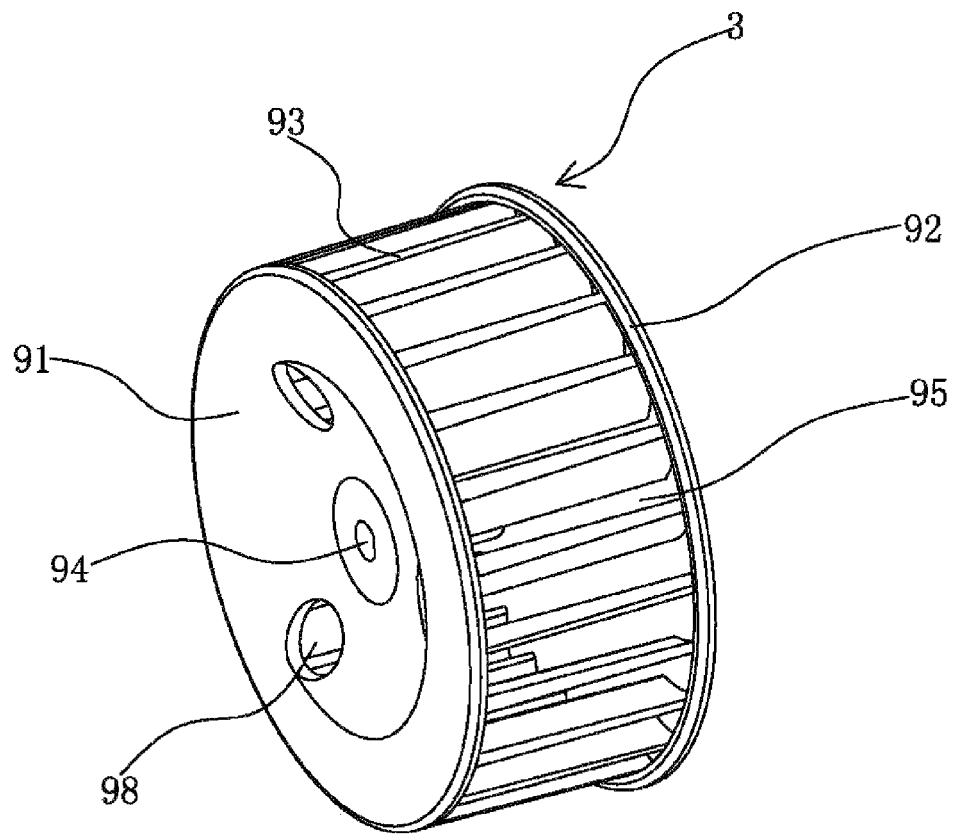
FIG. 7 is a structural schematic diagram of the impeller of the blower of the invention.

As shown in FIG. 5 and FIG. 7, the impeller 3 is of a cup-shaped opening structure and comprises a bottom board 91, a round ring 92 at the top and a plurality of blades 93 connected between the bottom board 91 and the round ring 92, the center of the bottom board 91 is provided with a transmission hole 94 which is in a transmission connection with the output shaft of the electromotor, the bottom of the impeller 3 gradually depresses towards the top from the circumference to the center, and three through holes 98 surrounding the transmission hole 94 are distributed on the bottom board. The blades are equidistantly distributed between the circumference of the bottom board and the round ring 92, clearances 95 are formed between adjacent blades 93, the blower casing 2 is provided with an inlet 96 which is coaxial with the impeller, the outer end of the inlet 96 forms an annular outwardly raised head 99, one end part of an inlet guide pipe 100 is sleeved on the periphery of the annular outwardly raised head 99, the other end of the inlet guide pipe 100 is communicated with the gas outlet 112 of the deodorizing box 103 (referring to FIG. 1), and the circumference of the blower casing 2 is provided with an outlet 97; when the impeller 3 rotates, air current enters the cup-shaped opening of the impeller from the inlet of the blower casing, then passes through the clearances among the blades and finally exhausted form the outlet of the blower casing.

Figure 8:
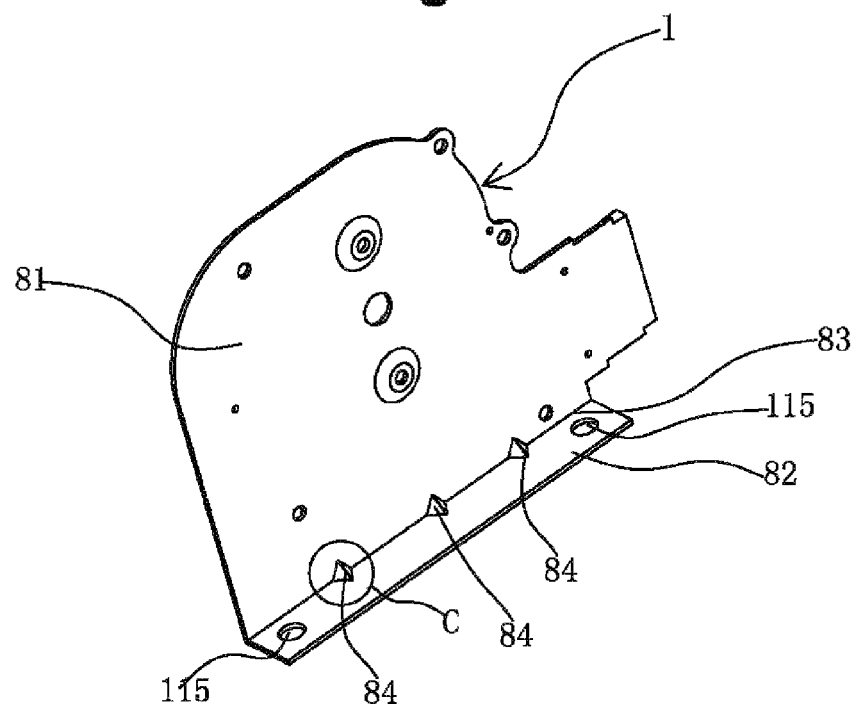
FIG. 8 is a structural schematic diagram of the mounting board of the blower of the invention.
Figure 9:
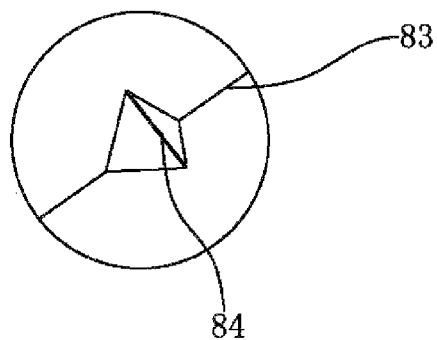
FIG. 9 is a schematic diagram of the magnified structure of C position of FIG. 8.

As shown in FIG. 8 and FIG. 9, the mounting board 1 comprises a board body 81 and a mounting portion 82, the first part of the board body 81 and the mounting portion 82 are of an integrated structure and are transitional by a break angle 83 which is an inclined angle of 90 degree, the break angle 83 forms an external corner part and an internal corner part, the external corner part of the break angle is punched into three recesses 85 (referring to FIG. 5) which are equidistantly distributed, three protrusions 84 which are equidistantly distributed are correspondingly formed at the internal corner part of the break angle, and each recess as well as each protrusion is in a wedge shape having an acute apex angle.

Figure 10:
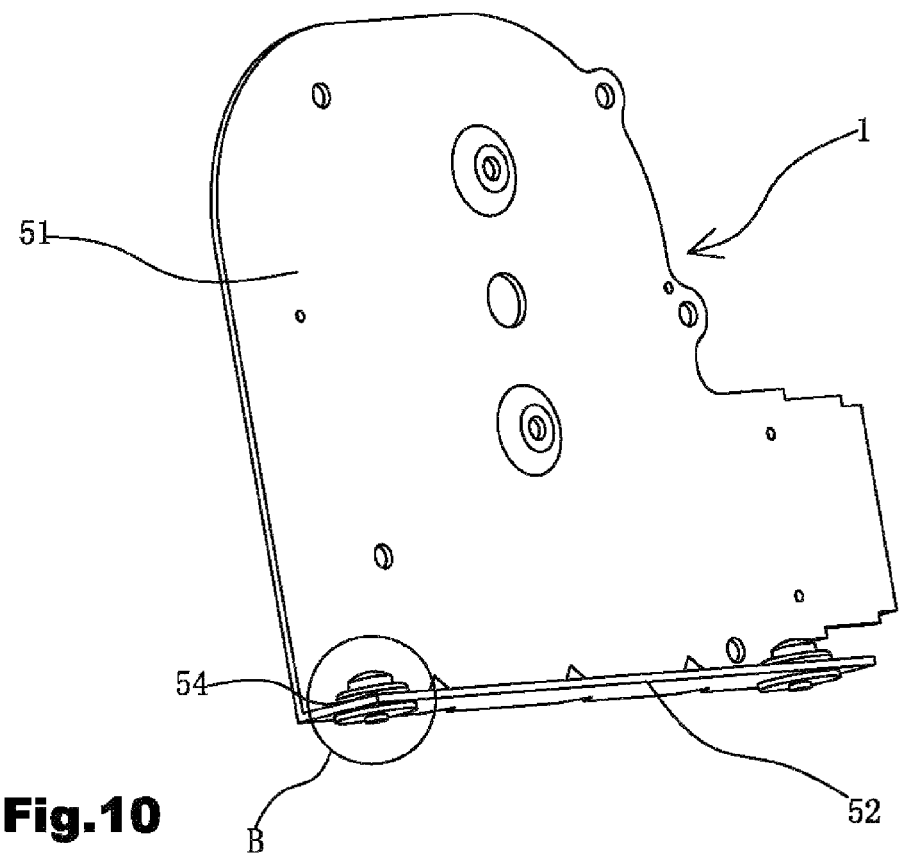
FIG. 10 is a structural schematic diagram of the damper on the mounting board of the invention.
Figure 11:
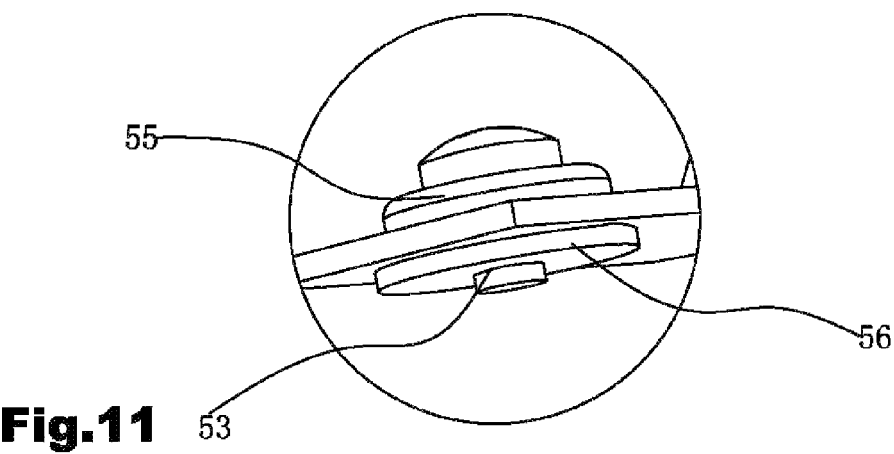
FIG. 11 is a magnified schematic diagram of B position of FIG. 10.

As shown in FIG. 10 and FIG. 11, the mounting portion 52 of the mounting board 1 is provided with two mounting holes 115 (referring to FIG. 8), a damper 54 having a central hole 53 is disposed in each mounting hole 115, each damper 54 is formed by an upper sheet body 55 and a lower sheet body 56 at the both ends and a cylindrical body connecting the upper sheet body 55 and the lower sheet body 56, and the upper sheet body 55 and the lower sheet body 56 are respectively positioned at both ends of the mounting hole; the external diameter of each upper sheet body as well as the external diameter of each lower sheet body is larger than the pore diameter of each mounting hole of the mounting portion, and both the upper sheet body and the lower sheet body of each damper are of round sheet structures; the thickness of each upper sheet body is twice greater than that of each lower sheet body, and the external diameter of the upper sheet body is smaller than that of the lower sheet body. During mounting, screw nails or screw bolts can penetrate through the central holes of the dampers to be fitted to the bottom of the casing such that the screw nails or screw bolts do not directly contact with the mounting portion of the mounting board, the screw nails or screw bolts and the mounting portion are insulated by the dampers, the bottom and the mounting portion of the mounting board are insulated by the lower sheet bodies 56, vibration probably generated by the blower in operation is absorbed by the dampers and thus can not be transmitted to the casing of the garbage disposer, the damping effect of the blower is greatly improved, and the noise caused by vibration is decreased; in addition, the recesses formed at the external corner part and the protrusions formed at the internal corner part of the break angle between the board body 81 and the mounting portion 82 function as rib stiffeners to enable the break angle between the board body 81 and the mounting portion 82 to have sufficient strength, thereby ensuring the reliable fixation of the blower on the bottom of the casing.

Figure 12:
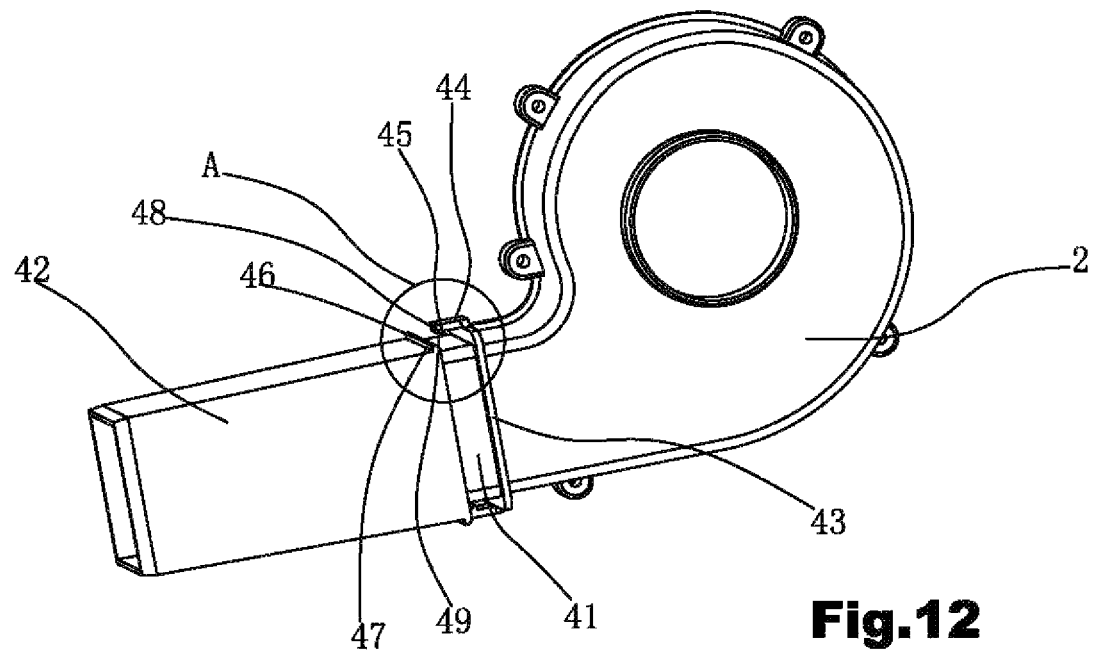
FIG. 12 is schematic diagram of a disassembled structure of the blower and the wind pipe of the invention.
Figure 13:
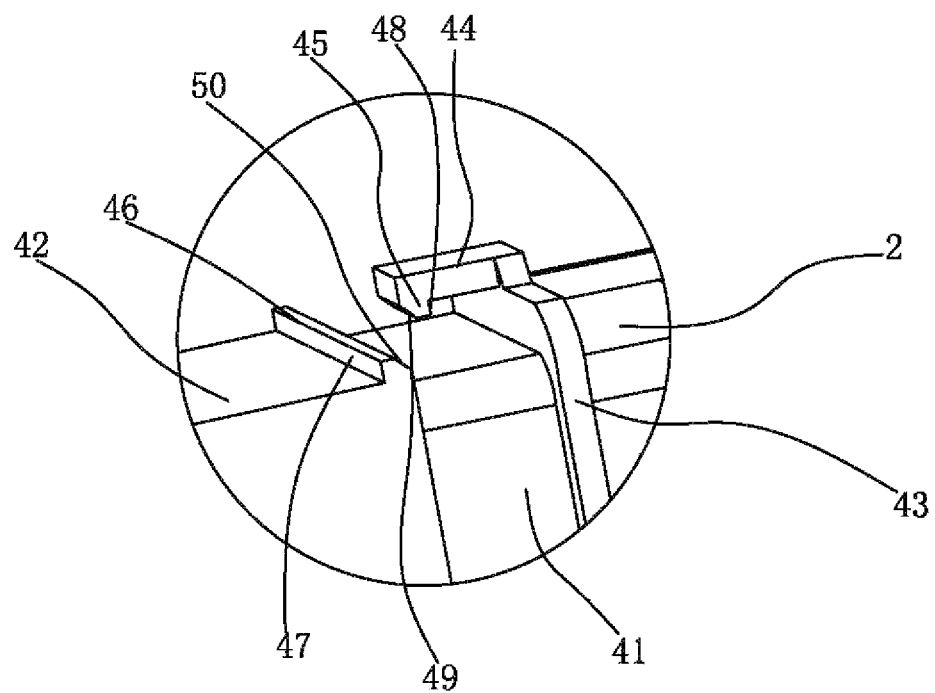
FIG. 13 is a magnified schematic diagram of A position of FIG. 12.
Figure 14:
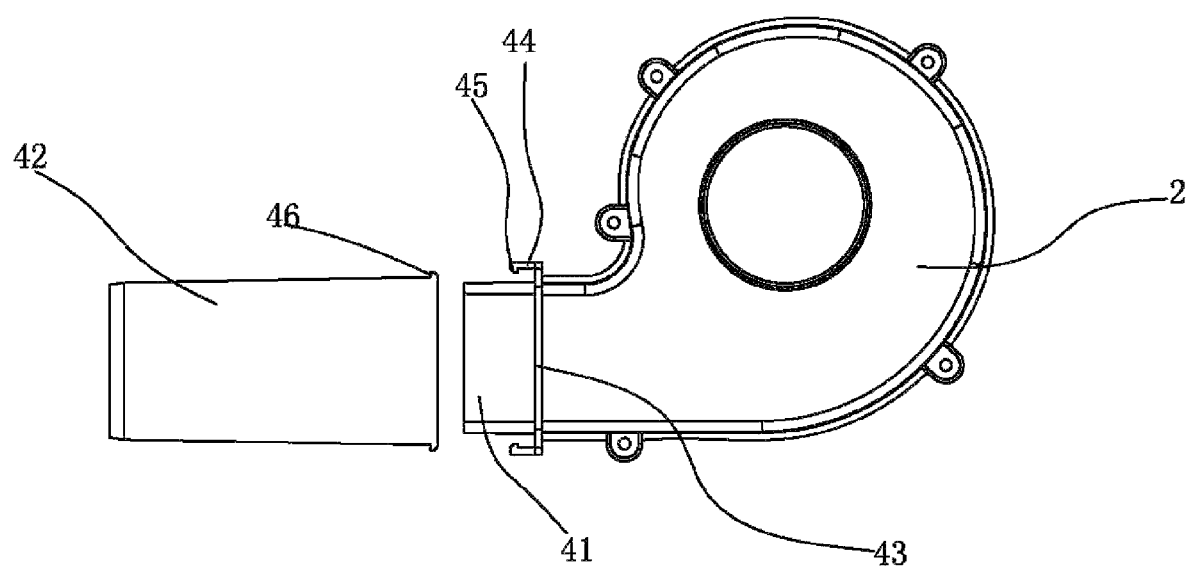
FIG. 14 is a schematic diagram of a planar disassembled structure of the blower and the wind pipe of the invention.

As shown in FIG. 12, FIG. 13 and FIG. 14, the outlet of the blower casing 2 forms an insertion connecting part 41, the external diameter of the insertion connecting part 41 is matched with the internal diameter of one end of a wind pipe 42, the other end of the wind pipe 42 leads to the outside of the casing, the cross section of the insertion connecting part 41 of the blower casing 2 as well as the cross section of the wind pipe 42 is in a rectangular shape, the root of the insertion connecting part 41 forms a circle of stopper 43, the edges of opposite sides of the stopper 43 are provided with two blocking bodies 44 pointing to the wind pipe, the inner side of the end part of each blocking body 44 closing to the wind pipe 42 forms a blocking protrusion 45, and a second sealing ring (not shown) is arranged between the end surface of the wind pipe and the stopper at the root of the insertion connecting part of the blower casing; correspondingly, the periphery of the end part of the wind pipe 42 is provided with blocking bars 46 fitting to the blocking protrusions 45 of the blocking bodies 44, and the end surface of the wind pipe 42 is abutted against the stopper 43 at the root of the insertion connecting part 41; a first insertion connecting surface 47 of each blocking protrusion 45 is perpendicular to the insertion connecting part 41, and a second insertion connecting surface 48 of the wind pipe 42 is perpendicular to the surface of the wind pipe 42; the end surface of each blocking protrusion 45 closing to the windpipe 42 forms a first inclined surface 49, and correspondingly, the end surface of each blocking bar 46 of the wind pipe 42 closing to the insertion connecting part 41 of the blower casing 2 forms a second inclined surface 50. In connection, the windpipe is only inserted in and fitted to the insertion connecting part formed at the outlet of the blower casing, and when the wind pipe is completely fitted to the insertion connecting part of the blower casing, the blocking protrusions on the blocking bodies are blocked with and fitted to the blocking bars on the wind pipe, wherein the end surface of the wind pipe is abutted against the stopper at the root of the insertion connecting part to limit excessive fit between the wind pipe and the insertion connecting part of the blower casing, and the fit between the blocking protrusions on the blocking bodies and the blocking bars on the wind pipe prevents the wind pipe from separating from the blower casing so as to reliably connect the wind pipe with the blower casing and limit the axial movement between the windpipe and the blower casing.

When the garbage disposer is used, a certain amount of substrate containing bacterial for decomposing food waste is filled in the garbage cup in advance, then the top cover is opened, and food waste is thrown in the garbage cup; the top cover is closed, the agitation driving motor drives the stirrer in the garbage cup to mix the food waste with the substrate, and the electrical heater on the outer wall of the garbage cup heats the garbage cup according to the condition of temperature in the garbage cup to ensure the temperature in the garbage cup to be suitable for the bacterial; meanwhile, the blower works continuously to exhaust odorous gas into the deodorizing box, the gas is treated by chemical deodorization in the deodorizing box and then exhausted to outside of the casing by the blower, and air is continuously supplemented into the garbage cup through the air inlet of the garbage cup communicated with the outside of the casing. The operations of said agitation driving motor, the blowers and the like are controlled by a program.

What is claimed is:

1. A garbage disposer comprising:
a casing formed by a bottom, a surrounding wall and a top cover at the top; wherein
two brackets are disposed on the bottom at intervals, a garbage cup having an opening at the upper end is fixedly mounted between the two brackets, the top cover is articulated with one side of the opening;
a stirrer is rotatably supported in the garbage cup, a rotating shaft of the stirrer extends to outside of one side of the garbage cup, an agitation driving motor is arranged besides the outside of the side of the garbage cup, and the agitation driving motor and rotating shaft of the stirrer are in transmission connection via a chain;
the garbage cup is provided with an air inlet communicated with outside of the casing and a gas outlet, and an electrical heater is arranged on the outer wall of the garbage cup;
a deodorizing box is disposed between the garbage cup and a wall of the casing, the deodorizing box is filled with chemical deodorizing oxidation material and has a gas inlet and gas outlet, the gas inlet of the deodorizing box is communicated with the gas outlet of the garbage cup, the gas outlet of the deodorizing box is communicated with the inlet of a blower mounted on the bottom of the casing, and an outlet of the blower communicated with outside of the casing; said blower comprises a mounting board and a blower casing disposed on one side of the mounting board, an impeller is arranged in a chamber defined by the mounting board and the blower casing, an electromotor is arranged at other side of the mounting board, an output shaft of the electromotor penetrates through the mounting board and is connected with the impeller in a transmission mode, an inlet of the blower is positioned on the blower casing and is coaxial with the impeller, an outlet of the blower is positioned on a circumference of the blower casing;

the mounting board includes a board body and a mounting portion which are formed integrally and are transitional by an angle, the angle forms an external corner part and an internal corner part, the external corner part of the angle is punched a plurality of recesses, and a plurality of protrusions are correspondingly formed at the internal corner part of the angle.

2. The garbage disposer according to claim 1, wherein said each recess is in a wedge shape having an acute apex angle, and correspondingly, said each protrusion is in a wedge shape having an acute apex angle; and said recesses are distributed equidistantly at the external corner parts of the break angle.

3. The garbage disposer according to claim 1 or 2, wherein the angle formed by the board body and the mounting portion is an angle of 90 degrees.

4. The garbage disposer according to claim 1 or 2, wherein the transmission chain between the agitation driving motor and the rotating shaft of the stirrer is provided with a chain tensioning device, the chain tensioning device comprises a mounting body on which two pressing heads are slidably connected, said two pressing heads can slide oppositely or toward each other, the opposite inner sides of said two pressing heads respectively form an arc surface, and tension springs are connected between the two pressing heads.

5. The garbage disposer according to claim 4, wherein said pressing heads are respectively provided with a slide hole, and the mounting body penetrates through the slide holes of the pressing heads and is slidably connected with the pressing heads; both sides of said each pressing head respectively form a hook body, the number of the tension springs is two, and said two tension springs are respectively disposed at both sides of the mounting body, and both ends of each tension spring are respectively clasped with the hook bodies of the pressing heads; said mounting body is provided with a first insertion post and a second insertion post for insertion connection, wherein the first insertion post is positioned at one end of the mounting body and corresponds to the outer side of the pressing head at the end, the second insertion post is positioned at the other end of the mounting body and corresponds to the inner side of the pressing head at said the other end, and the mounting body corresponding to the outer side of the pressing head at said the other end is fitted with a large head limit portion for limiting the pressing head from removal; the arc surface of the inner side of said each pressing head is formed by a large middle arc surface having a larger diameter and two small arc surfaces having the diameter smaller than that of the larger arc surface; and the chain tension device is inserted in and fitted to the mounting hole formed on the brackets through the first insertion post and the second insertion post of the mounting body.

6. The garbage disposer according to claim 1 or 2, wherein said mounting portion is provided with a plurality of mounting holes, a damper having a central hole is disposed in each mounting hole, said damper is formed by an upper sheet body and a lower sheet body at both ends and a cylinder body connecting the upper sheet body and the lower sheet body, and the upper sheet body and the lower sheet body are respectively positioned at both ends of each mounting hole of the mounting portion.

7. The garbage disposer according to claim 6, wherein both the upper sheet body and the lower sheet body of each damper are of round sheet structures, and the external diameter of the upper sheet body as well as the external diameter of the lower sheet body is greater than the pore diameter of each mounting hole of the mounting portion; and the thickness of the upper sheet body is greater than that of the lower sheet body, and the external diameter of the upper sheet body is smaller than that of the lower sheet body.

8. The garbage disposer according to claim 1 or 2, wherein said impeller is of a cup-shaped opening structure and comprises a bottom board at the bottom, a round ring at the top and a plurality of blades connected between the bottom board and the round ring, the center of said bottom board is provided with a transmission hole which is connected with the output shaft of the electromotor in a transmission mode, clearances are formed between adjacent blades of said blades for wind passing through, and when the impeller rotates, air current enters the cup-shaped opening of the impeller from the inlet of the blower casing, passes through the clearances among the blades and is finally exhausted from the outlet of the blower casing; and the bottom of the impeller gradually depresses towards the top from the circumference to the center, and the bottom board is also provided with a plurality of through holes surrounding the transmission hole.

9. The garbage disposer according to claim 1 or 2, wherein the opening edge of the blower casing is attached to the mounting board, the blower casing is connected with the mounting board by connecting screw bolts, a sealing ring is arranged between the opening edge of the blower casing and the mounting board, and the outer edge of the sealing ring is provided with outward protruding portions on which connecting holes are positioned for the connecting screw bolts passing through; and one side of the sealing ring contacting with the opening edge of the blower casing is provided with a groove fitting to the opening edge of the blower casing.

10. The garbage disposer according to claim 1 or 2, wherein the outlet of the blower casing forms an insertion connecting part, the external diameter of the insertion connecting part fits to the internal diameter of a wind pipe communicated with the outside of the casing, the root of the insertion connecting part forms a circle of stopper on which a plurality of blocking bodies pointing to the wind pipe are formed, and the inner sides of the blocking bodies closing to the end part of the wind pipe form blocking protrusions; correspondingly, the periphery of the end part of said wind pipe is provided with blocking bars fitting to the blocking protrusions of the blocking bodies, and the end surface of the wind pipe is abutted against the stopper positioned at the root of the insertion connecting part; the cross section of the insertion connecting part of the blower casing as well as the cross section of the wind pipe is in a rectangular shape, and said blocking bodies are arranged on the two opposite edges of the stopper of the insertion connecting part; a first insertion connecting surface of each block protrusion is perpendicular to the insertion connecting part, and correspondingly, a second insertion connecting surface of the wind pipe is perpendicular to the surface of the wind pipe; and the end surface of each blocking protrusion closing to the wind pipe forms a first inclined surface, and the end surface of each blocking bar of the wind pipe closing to the insertion connecting part of the blower casing correspondingly forms a second inclined surface.

* * * * *